(12) United States Patent
Sudhana et al.

(10) Patent No.: US 8,021,060 B2
(45) Date of Patent: Sep. 20, 2011

(54) ADJUSTABLE SUPPORT HEAD FOR OPTICAL OR VIDEO/PHOTOGRAPHIC EQUIPMENT

(75) Inventors: Hem Sudhana, Cassola (IT); Andrea Zen, Bassano Del Grappa (IT)

(73) Assignee: Gitzo S.A., Rungis (FR)

( * ) Notice: Subject to any disclaimer, the term of this patent is extended or adjusted under 35 U.S.C. 154(b) by 0 days.

(21) Appl. No.: 12/664,057

(22) PCT Filed: May 9, 2008

(86) PCT No.: PCT/EP2008/055749
§ 371 (c)(1),
(2), (4) Date: Dec. 10, 2009

(87) PCT Pub. No.: WO2008/151886
PCT Pub. Date: Dec. 18, 2008

(65) Prior Publication Data
US 2010/0172643 A1    Jul. 8, 2010

(30) Foreign Application Priority Data

Jun. 11, 2007   (IT) .................................. 2007A0203

(51) Int. Cl.
*F16M 11/14* (2006.01)
(52) U.S. Cl. ..................................... 396/428; 248/187.1
(58) Field of Classification Search .................. 396/419, 396/428; 248/181.1, 181.2, 187.1
See application file for complete search history.

(56) References Cited

U.S. PATENT DOCUMENTS

| | | | |
|---|---|---|---|
| 807,857 A | 12/1905 | Palmenberg | |
| 2,752,116 A * | 6/1956 | Minnis | 248/181.1 |
| 4,068,961 A * | 1/1978 | Ebner et al. | 403/55 |

(Continued)

FOREIGN PATENT DOCUMENTS

DE            861323          12/1952

(Continued)

OTHER PUBLICATIONS

ISR and Written Opinion in PCT application PCT/EP2008/055749.

(Continued)

*Primary Examiner* — Clayton E Laballe
*Assistant Examiner* — Leon W Rhodes
(74) *Attorney, Agent, or Firm* — Kristina Castellano; Castellano PLLC

(57) ABSTRACT

An adjustable support head (1) for optical or video/photographic equipment, comprising a joint (5) including a first (3) and a second joint element (18), a body (3) defining the said first joint element, a connection plate (4) for the optical or video/photographic equipment, connected to the said second joint element, so as to enable the said connection plate to be freely adjustable in relation to the said body, locking means (25) mounted on the said body and including a clamping element (26) that can be selectively moved between a first non-operating position in which the clamping element is distanced from the second joint element and a second operating position in which the clamping element is in contact with the second joint element so as to lock the said second joint element in a desired position in relation to the first joint element. The head (1) also comprising adjustable friction means (35) mounted on the body and including at least one slide (36) placed in contact with the second joint element so as to adjust the sliding of the second joint element in relation to the first joint element. The friction means comprise resilient means (37) interposed between the clamping element and the slide to adjust the friction means by moving the clamping element between the first non-operating position and the second operating position.

17 Claims, 4 Drawing Sheets

U.S. PATENT DOCUMENTS

| | | | |
|---|---|---|---|
| 4,083,524 A * | 4/1978 | O'Connor | 248/183.3 |
| 4,703,909 A | 11/1987 | Dayton et al. | |
| 4,886,230 A * | 12/1989 | Jones et al. | 248/170 |
| 4,915,333 A * | 4/1990 | Bolondi | 248/181.1 |
| 4,974,802 A | 12/1990 | Hendren | |
| 5,957,445 A | 9/1999 | Hagman et al. | |
| 6,352,228 B1 * | 3/2002 | Buerklin | 248/181.1 |
| 7,464,906 B2 * | 12/2008 | Temperato et al. | 248/181.1 |
| 7,681,846 B1 * | 3/2010 | Mijailovic | 248/181.1 |
| 2006/0175482 A1 | 8/2006 | Johnson | |

FOREIGN PATENT DOCUMENTS

| | | |
|---|---|---|
| DE | 9011338 U1 | 10/1990 |
| FR | 1018869 A | 1/1953 |
| GB | 869221 A | 5/1961 |
| GB | 1172930 A | 12/1969 |

OTHER PUBLICATIONS

International Preliminary Report on Patentability in PCT application PCT/EP2008/055749.

* cited by examiner

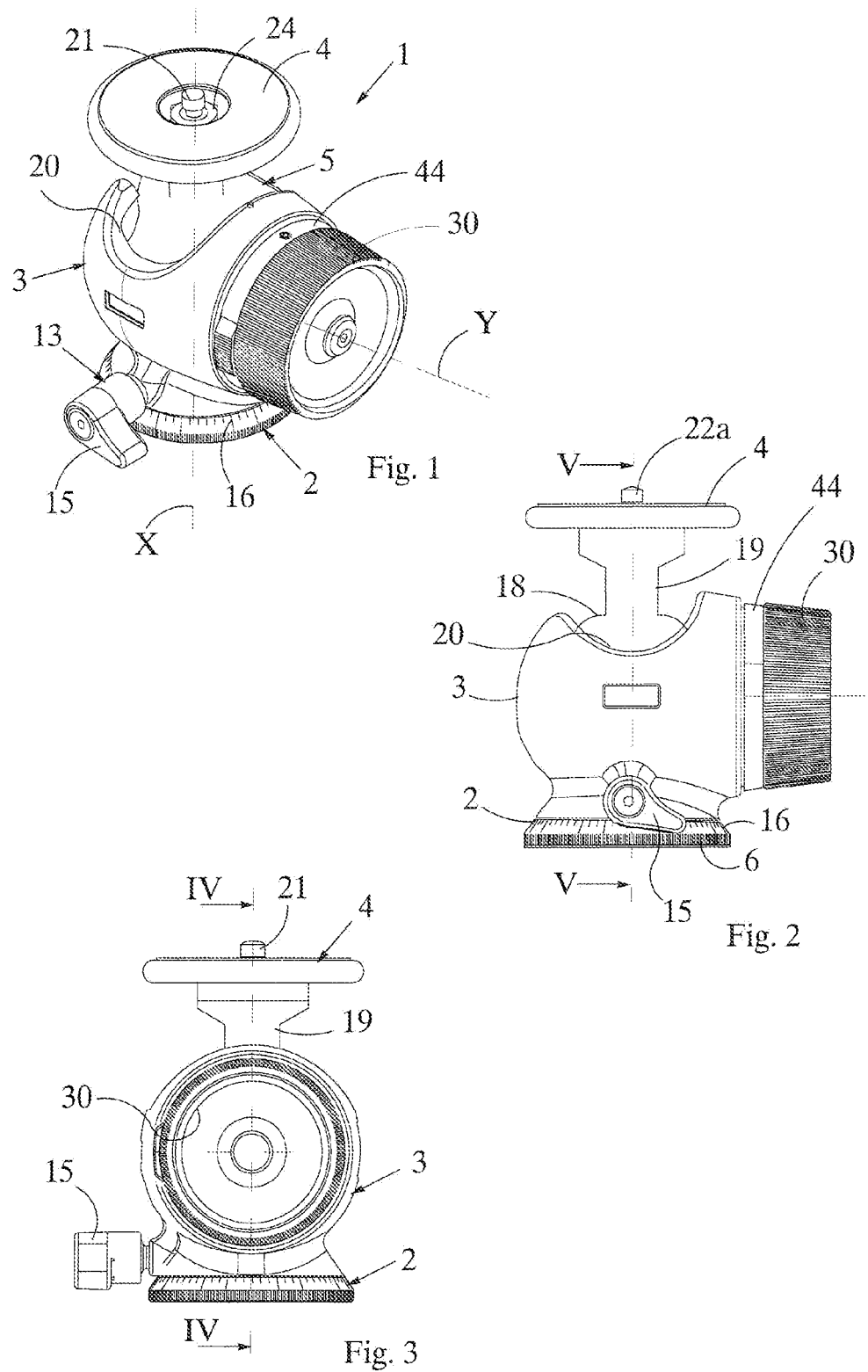

ADJUSTABLE SUPPORT HEAD FOR OPTICAL OR VIDEO/PHOTOGRAPHIC EQUIPMENT

CLAIM FOR PRIORITY

This application is a U.S. National Stage Application of PCT/EP2008/055749 filed on May 9, 2008, claiming priority to Italian Patent Application number PD2007A000203 filed Jun. 11, 2007, the contents of both of which are incorporated herein by reference.

TECHNICAL FIELD

The present invention concerns an adjustable support head for optical or video/photographic equipment having the features described in the pre-characterising clause of the main claim.

TECHNOLOGICAL BACKGROUND

Adjustable support heads of the type indicated are typically used in connection with stands, tripods or other supports known within the technical sector in question to support optical or video/photographic equipment in one or more pre-selected spatial positions.

These heads are typically equipped with one or more articulated joints, for example of the spherical or cylindrical type, to vary the reciprocal position of the equipment supported by the head in relation to the support on which the head is fixed.

Generally, traditional support heads are equipped with special locking means that can be selectively activated to lock the joint in a desired position and, respectively, to release the joint so as to allow the equipment to be re-positioned.

In one of its more common forms, the locking means comprise a pin element, engaged by screwing into one of the joint elements and capable of being moved against another joint element so as to lock its relative movement owing to the friction exerted upon it.

Heads of this type have one serious limitation, however, due to the fact that, when the locking means are released, the equipment is completely free to move in relation to the support. This fact, particularly in the case of heads with a ball element, can be the cause of undesirable and sudden imbalances of the equipment supported by the joint with the consequent risk of the equipment and the entire support device falling and being damaged.

The manoeuvre to release the head must therefore be performed using both hands, one to operate the locking means and the other to provide adequate support for the equipment.

In order to overcome this drawback, support heads have been devised, also by the Applicant, that comprise friction means, arranged always to maintain a minimum level of friction between the elements of the joint, so as to prevent sudden and accidental movements on releasing the locking means. The friction means usually comprise one or more slides, produced of an appropriate material, mounted on a first joint element and loaded against the surface of a second joint element.

The optimum level of friction required between the joint elements is clearly dependent on the weight and size of the equipment supported, and so the force with which the slide is loaded against the second joint element is adjustable by means of a knob or control lever, separate and distinct from the control knob or lever of the locking means.

This, however, involves an undesirable complication of the shape of the support head, its dimensions and, above all, its internal mechanisms.

DESCRIPTION OF THE INVENTION

The problem that lies at the heart of the present invention is to make an adjustable support head for optical or video/photographic equipment which is structurally and operationally designed to overcome the above-mentioned limitations with reference to the said known art.

This problem is solved by the present invention by means of an adjustable support head produced according to the claims below.

BRIEF DESCRIPTION OF THE DRAWINGS

Other features and advantages of the present invention will become clear from the following detailed description of some of its preferred embodiments which are shown by way of non-limiting examples in the appended drawings, in which:

FIG. 1 is a perspective overall view of a first embodiment of an adjustable support head for optical or video/photographic equipment produced according to the present invention;

FIG. 2 is a front elevation of the support head shown in FIG. 1;

FIG. 3 is a side elevation of the support head shown in FIG. 1;

PREFERRED EMBODIMENT OF THE INVENTION

Figure 4:
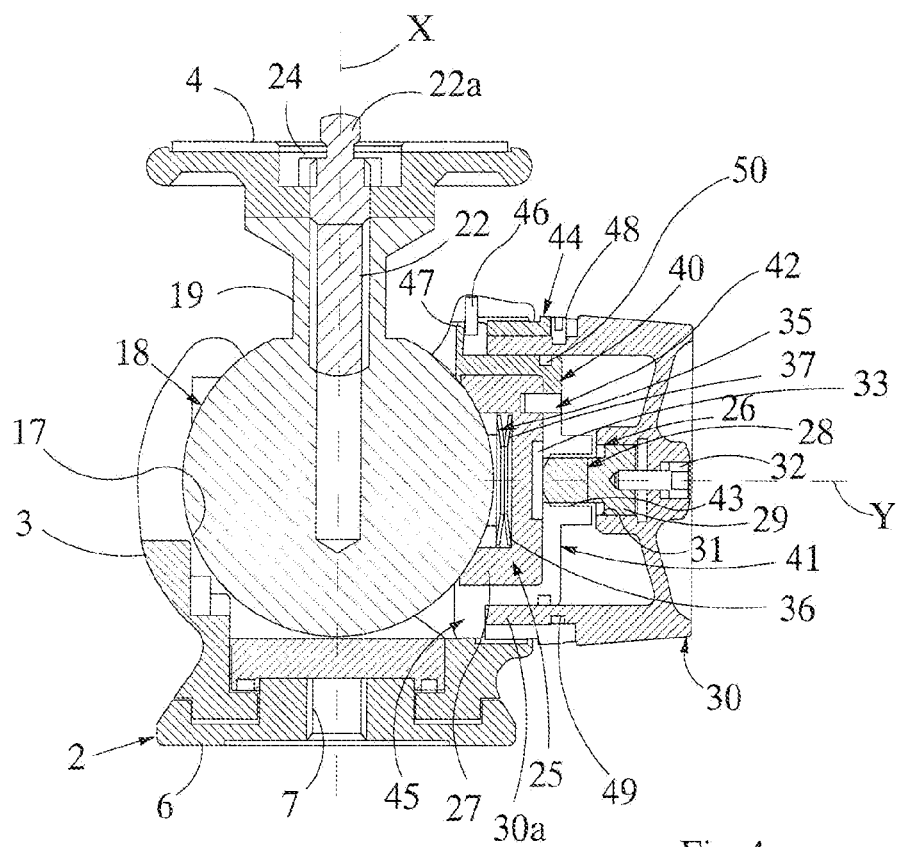
FIG. 4 is a cross-section along line IV-IV in FIG. 3, on an enlarged scale.
Figure 5:
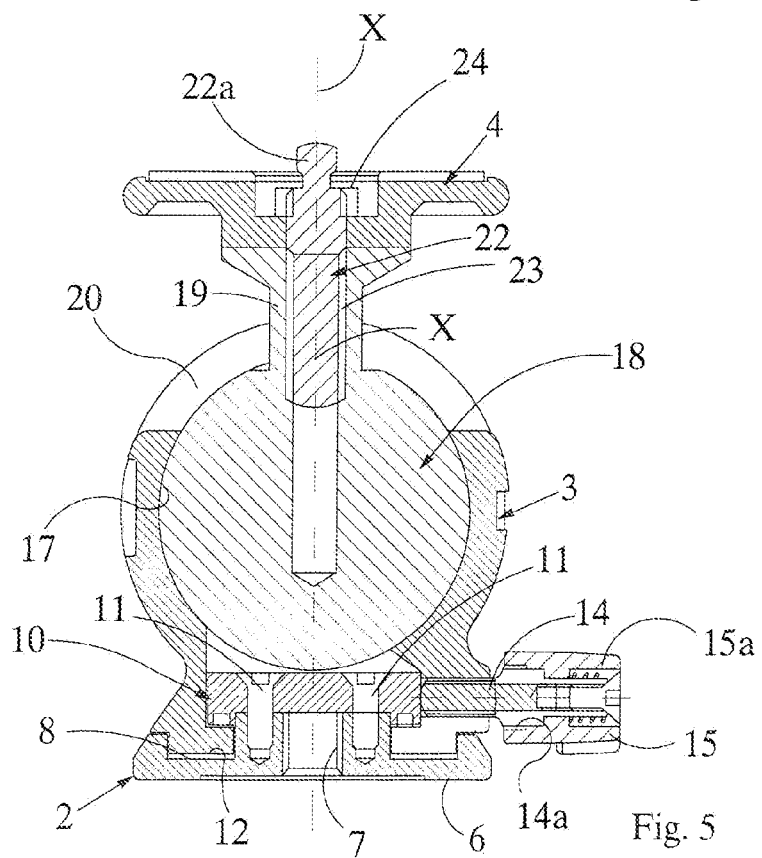
FIG. 5 is a cross-section along line V-V in FIG. 2, on an enlarged scale.

Referring initially to FIGS. 1 to 5, 1 shows as a whole an adjustable support head for optical or video/photographic equipment produced according to the present invention.

The head 1 comprises a base 2, a body 3 connected so as to rotate on the base 2, as well as an attachment plate 4 connected to the body 3 by means of an articulated joint 5.

The base 2 has a substantially planar surface 6 to rest the head 1 on a support, such as a stand or tripod, which is conventional and not shown in the Figure. A threaded hole 7 is also open at the surface 6 to allow engagement with a corresponding threaded pin located at the top of the support and thus allow the firm connection between the latter and the head 1. The axis X of the threaded hole 7 coincides with the axis of symmetry of the base 2 and is perpendicular to the contact surface 6.

On the side remote from the contact surface 6, a circumferential groove 8 is produced, in which is housed, in sliding engagement, a foot 9 of the body 3.

A plate 10 is removably fixed by means of screws 11 to the base 2 in order to hold the foot 9 in the groove 8, so that the body 3 is secured to the base 2 and able to rotate freely about the axis X. A washer 12, produced of a material with a low friction coefficient, lies at the bottom of the groove to allow the foot 9 to slide easily.

Stop means 13 are also mounted on the body 3 to lock the body 3 in relation to the base 2 in the desired angular position. The stop means 13 may be of any type known within the sector and, in this particular case, comprise a threaded pin 14 selectively movable away from and towards the plate 10 by means of a knob 15, which is preferably loaded by meshing with the head 14a, against the action of the spring 15a to enable it, if necessary, to be angularly repositioned.

To make it easier to adjust the body 3 in relation to the base 2 in a pre-defined angular position, the outer surface of the base 2 is also advantageously marked with a graduated scale 16.

The body 3 is generally shell-shaped with a cavity 17 inside it forming a housing for a spherical ball element 18 to which the connection plate 4 is integrally connected by means of a stem 19.

The body 3, having the cavity 17 within, and the ball element 18 constitute the first and second joint element respectively of the joint 5, which in the preferred case described here, is of the spherical type. It is understood that the joint 5 could similarly be of a different type, for example a cylindrical joint.

The connection plate 4 is freely adjustable in relation to the body 3 within the limits defined by an opening 20, produced in the body 3 on the opposite side to the base 2, which is passed through by the stem 19.

The connection plate 4 also has a known connection 21 for connection to the head 1 of an optical or video/photographic device, not shown.

The connection 21, shown in this embodiment, comprises a pin 22 engaged by screwing in a hole 23 open on the connection plate 4 and extending axially along the stem 19 and radially through the ball element 18. The pin 22 is held in position by a nut 24 and has a threaded head 22a capable of engaging in a corresponding threaded hole on the optical or video/photographic equipment to be supported.

The head 1 also comprises locking means 25, arranged to prevent the ball element 18 from sliding freely inside the cavity 17, and consequently to lock the mutual position between the body 3 and the connection plate 4.

The locking means 25 include a clamping element 26 which is selectively movable in a direction Y, radial in relation to the ball element 18, between a first non-operating position in which the clamping element 26 is distanced from the ball element 18 and a second operating position in which it is clamped against the surface of the ball element 18, so as to lock the ball element 18 in relation to the body 3.

The movement of the clamping element 26 in the direction Y is controlled by a knob 30.

The clamping element 26 preferably comprises a cup-shaped formation 27 designed to come into contact with the ball element 18 and a control pin 28 that comes into contact with the cup-shaped formation 27 on the opposite side to the ball element 18.

The cup-shaped formation 27 has a concavity facing towards the ball element 18, and its free edges, designed to come into contact with the ball element 18, are shaped so as to mate with spherical surface thereof.

Preferably, in order firmly to lock the joint 5, the cup-shaped formation 27 is produced of a metal material, such as aluminium.

The control pin 28 is fitted with a polygonal-section head 29, which is engaged in a seat 31, having the same cross-section, defined on the knob 30 and is held therein, with the possibility of limited axial movement, by a screw 32. A reinforcement plate 33 is also interposed between the control pin 28 and the cup-shaped formation 27.

The head 1 also comprises adjustable-action friction means 35 capable of stopping the ball element 18 from sliding in relation to the body 3 when the clamping element 26 is positioned distant from the ball element 18. The friction means 35 comprise a ring-shaped slide 36 loaded against the spherical surface of the ball element 18 by the action of a resilient means, such as a Belleville washer 37.

According to a first aspect of the present invention, the Belleville washer 37 is interposed between the slide 36 and the clamping element 26, so that the intensity of the braking action exerted by the slide 36 on the ball element 18 is adjusted by moving the clamping element 26 between its first non-operating position and its second operating position.

In particular and advantageously, the Belleville washer 37 and the slide 36 are housed in the cup-shaped formation 27 of the clamping element 26.

Preferably, the slide 36 is produced of a material that has a low friction coefficient, such as a polytetrafluoroethylene (PTFE)-based or PTFE-loaded polymer material.

The head 1 also comprises travel-limiting means 40, capable of coming into contact with the clamping element 26 in its movement away from the ball element 18, thus in fact defining the first non-operating position thereof.

For this purpose, the travel limiting means 40 comprise a contact element 41 interposed between the knob 30 and the cup-shaped formation 27. Advantageously, the contact element 41 is of a similar shape to the cup-shaped formation 27, so as to accommodate it and guide it within itself in its axial movement away from and towards the ball element 18. Apart from the similarity of shape, the connection between the contact element 41 and the cup-shaped formation 27 is produced by a pin 42 which prevents relative rotation between the two component parts.

In its middle area, the contact element 41 has a threaded hole 43 in which the threaded shank of the control pin 28 is engaged by screwing.

The contact element 41 is preferably movable in the axial direction Y by means of a ring nut 44, engaged by screwing onto the body 3, and loaded with one of its ends against a flange 45 extending from an edge of the contact element 41. Relative rotation between the contact element 41 and the body 3 is prevented by a pin 46 which, however, is accommodated in a seat 47 which is elongated in direction Y and produced in the flange 45, so as to enable a limited axial translation of the contact element 41 in relation to the body 3.

The ring nut 44 is also restrained, together with the knob 30, with the possibility of relative free rotation about the axis Y, by a setscrew 48 engaged in a groove 49 running circumferentially round a collar 30a extending axially from the knob 30 so as to be interposed between the ring nut 44 and the contact element 41. A sealing ring 50 is also advantageously arranged between the contact element 41 and the collar 30a.

Preferably, the ring nut 44 is housed in a shoulder formed between the knob 30 and the collar 30a.

In a variation of the present invention, the travel limiting means comprise a screw engaged by screwing along the axis Y into the knob 30 and capable of coming into contact with the head 29 of the control pin 28.

The positioning of the connection plate 4 in relation to the body 3 is achieved by having the clamping element 26 in the first non-operating position, i.e. in the position that is distant from the ball element 18.

In this configuration, owing to the joint 5, the connection plate 4 can easily be moved by the operator in relation to the body 3, the only resistance to be overcome being the braking action exerted by the friction means 35, via the friction between the slide 36 against the ball element 18.

Once the desired adjustment is achieved, the joint 5 is locked in position by acting on the locking means 25 by means of the knob 30.

The rotation of the knob 30, which is free in relation to the ring nut 44 and the body 3, results in the rotation of the control pin 28 and its consequent translation along the axis Y towards the ball element 18, caused by its screwing into the hole 46 produced in the contact element 41.

The axial movement of the control pin 28 causes the same movement of the cup-shaped formation 27 towards the ball element 18. This movement is guided inside the positioning element 41, which by contrast stays in a fixed position, and involves the compression of the Belleville washer 37 and thus an increase in the braking action exerted by the slide 36 on the ball element 18.

When the cup-shaped formation 27 comes into contact with the ball element 18 (second operating position), the joint 5 is locked in position. It will be appreciated that no component visible from the outside undergoes axial movement during this stage.

The joint 5 is released by rotating the knob 30 in the opposite direction which moves the control pin 28, and also the cup-shaped formation 27, loaded by the Belleville washer 37, away from the ball element 18.

As soon as the cup-shaped formation detaches itself from the ball element 18, the free movement of the ball element 18 inside the cavity 17 is advantageously braked by the slide 36 which, in this position, exerts its maximum friction. As the knob 30 is gradually rotated, the distance of the cup-shaped formation 27 from the ball element 18 increases and consequently reduces the friction exerted by the slide 36 on the ball element 18 which can then easily be moved by the operator.

In this way sudden and undesirable falling of the equipment supported by the head 1 is avoided.

The movement of the cup-shaped formation 27 is stopped by the contact element 41 which acts as an end stop and defines the first non-operating position.

Advantageously, the axial position of the contact element 41 can be adjusted by turning the ring nut 44. In fact, rotation of the latter causes it to move axially to engage by screwing with the body 3 and consequently, thanks to its thrust on the flange 45, also causes the axial movement of the contact element 41. By appropriately adjusting the axial position of the contact element 41, it is possible to set a minimum desired level of friction on the joint 5.

Note also that, thanks to the engagement of the setscrew 48 in the groove 49, the knob 30 is drawn along axially by the ring nut 44 so as to maintain continuous contact between the knob 30 and the ring nut 44.

Figure 6:
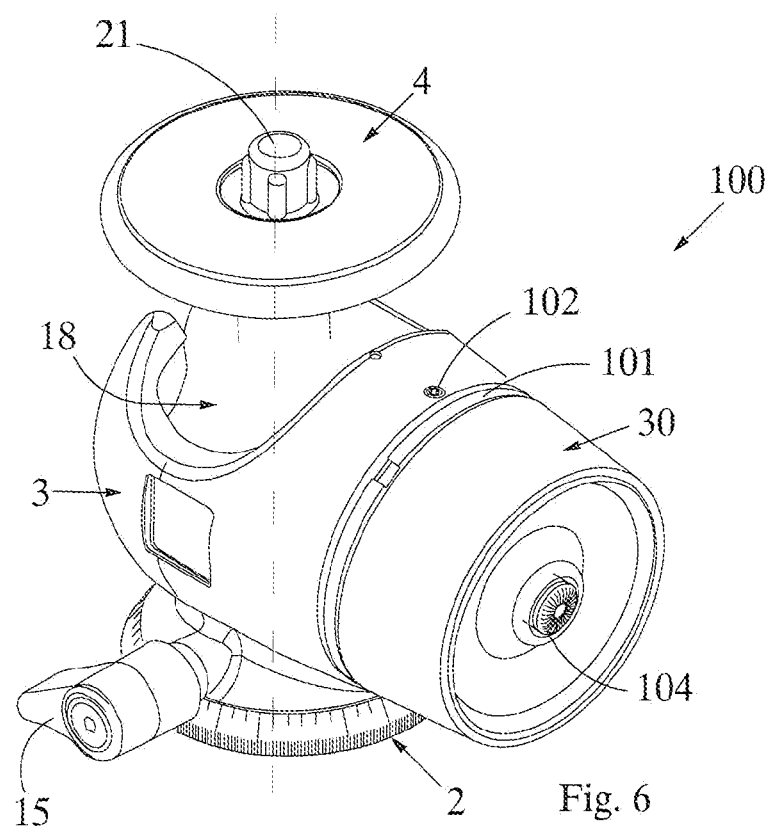
FIG. 6 is a perspective overall view of a second embodiment of an adjustable support head for optical or video/photographic equipment produced according to the present invention.
Figure 7:
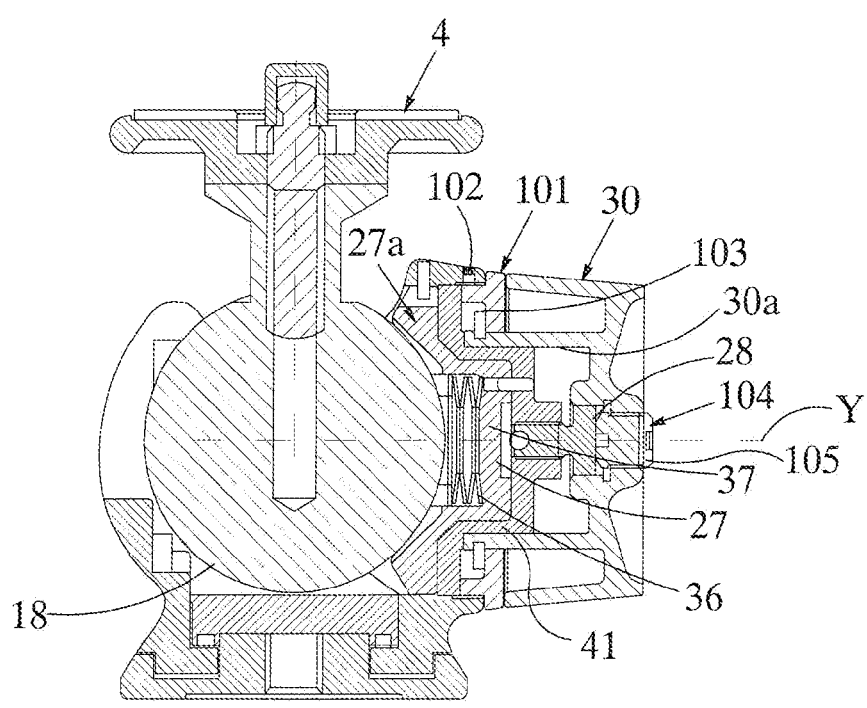
FIG. 7 is a cross-section of the support head shown in FIG. 6.

A second embodiment of a support head produced according to the invention is shown in FIGS. 6 and 7 and indicated as a whole by 100 in FIGS. 6 and 7. Parts similar to the head described in the previous embodiment bear the same reference numerals.

The head 100 differs from the head 1 in that the contact element 41 cannot be moved in the direction Y, but is instead held in a fixed axial position in relation to the body 3, tightly against a flange 27a, extended perimetrally by the cup-shaped element 27, by a ring nut 101 screwed onto the body 3 and secured by a setscrew 102.

The ring nut 101 is fitted onto the collar 30a of the knob 30 which is secured to prevent it from sliding off the body 3 by a resilient (Seeger type) locking ring inserted into a groove in the collar 30a and fitted over the ring nut 101.

The travel limiting means of the head 100 also comprise, in addition to the fixed contact element 41, a stop pin 104 engaged by screwing onto the knob 30 in the direction Y and capable of axially coming into contact with the head 29 of the control pin 28 in its movement away from the spherical ball element 18.

The axial position of the stop pin 104 can be adjusted by screwing it onto the knob 30, by directly turning the head 105 of the pin, which is appropriately projecting in relation to the body of the knob 30.

The operation of the head 100 is substantially similar to that of the head 1 described in the previous embodiment, the difference being that the minimum level of friction exerted by the slide 36 on the ball element 18 is adjusted by positioning the stop pin 104 and not by operating the contact element 41. The latter, by contrast, advantageously serves as a final end stop for the axial movement of the clamping element, should the stop pin 104 be too loose or completely removed.

The support head 100 also differs from the head 1 in that it is cheaper to produce.

Figure 8:
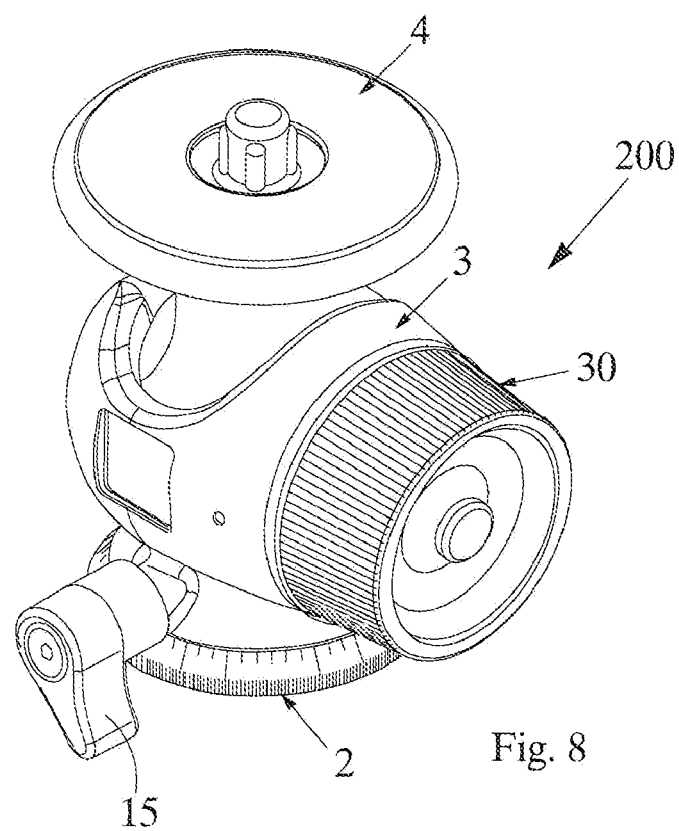
FIG. 8 is a perspective overall view of a third embodiment of an adjustable support head for optical or video/photographic equipment produced according to the present invention.
Figure 9:
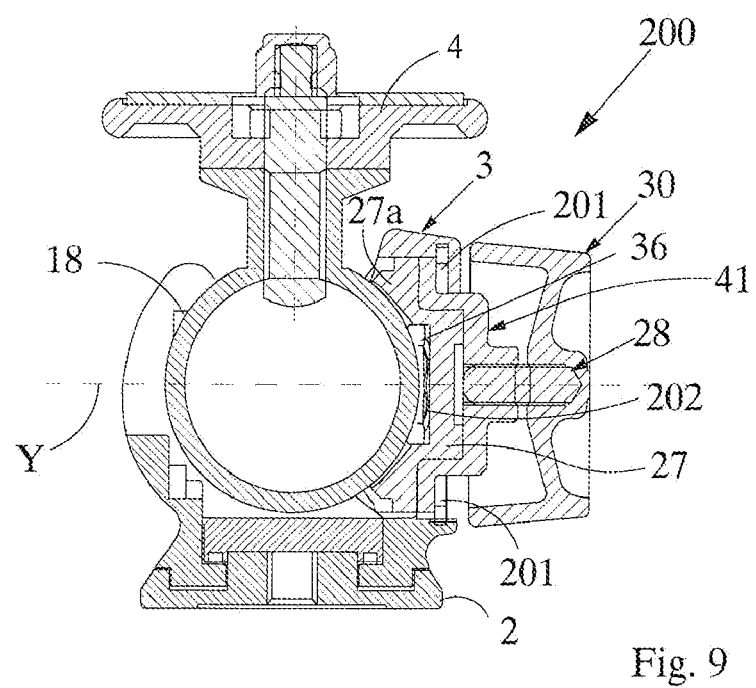
FIG. 9 is a cross-section of the support head shown in FIG. 8.

FIGS. 8 and 9 show a third embodiment of the support head according to the present invention. The head is indicated as a whole by 200 while component parts similar to those shown in the embodiments of heads described previously bear the same reference numerals.

The head 200 differs from the heads 1 and 100 in that it does not offer the possibility of adjustment of the minimum level of friction of the friction means.

In the head 200, the contact element 41 is held in a fixed position in relation to the body 3 by a resilient ring 201 engaged in a circumferential groove produced in the body 3 which holds the contact element 41 against the flange 27a of the cup-shaped formation 27.

Furthermore, the resilient means, instead of being a Belleville washer, are in the form of a cheaper spring washer 202 and the control pin 28 is fixed to the knob 30 by screwing. In this case, a rotation of the knob 30 will result in a similar axial movement thereof.

The manufacture of the head 200 will be simpler and cheaper than that of the heads described in the previous embodiments.

The present invention thus solves the above-described problem regarding the cited known art, while at the same time offering many other advantages, including that of providing a very compact adjustable support head, with one control that adjusts both the friction action and the locking of the joint. Furthermore, the adjustment of the minimum level of friction, in the embodiments that offer this option, can easily be achieved without the need for special devices.

Another advantage lies in the fact that the friction and locking means are separate, enabling the most suitable material with which to enter into contact with the spherical ball element to be chosen for each one of them.

The invention claimed is:

1. An adjustable support head for optical or video/photographic equipment, comprising:
   a joint including a first joint element and a second joint element;
   a body defining said first joint element;
   a connection plate for said optical or video/photographic equipment, connected to said second joint element, so as to enable said connection plate to be freely adjustable in relation to said body;
   locking means mounted on said body and including a clamping element that can be selectively moved between a first non-operating position in which the clamping element is distanced from said second joint element and a second operating position in which the clamping element is in contact with said second joint element so as to lock said second joint element in a desired position in relation to said first joint element;

adjustable friction means mounted on said body and including at least one slide placed in contact with said second joint element so as to adjust the sliding of said second joint element in relation to said first joint element;

wherein said friction means comprise resilient means interposed between said clamping element and said at least one slide to adjust said friction means by means of said movement of said clamping element between said first non-operating position and said second operating position.

2. The support head according to claim 1, wherein said joint is a ball joint and said first joint element comprises a spherical seat to house a spherical ball element forming said second joint element.

3. The support head according to either claim 1, wherein said resilient means and said slide are housed and guided inside said clamping element.

4. The support head according to claim 3, wherein said clamping element comprises, at one of its ends near said second joint element, a cup-shaped formation in which are housed and guided said resilient means and said slide.

5. The support head according to claim 1, wherein said slide is produced of a material that has a low friction coefficient.

6. The support head according to claim 5, wherein said slide is produced of a PTFE-based or PTFE-containing polymer material.

7. The support head according to claim 1, wherein said clamping element comprises aluminium on at least one surface of contact with said second joint element.

8. The support head according to claim 1, wherein said clamping element is engaged with the possibility of relative axial movement, in a knob mounted on said body in order to rotate freely in relation thereto, so as to move said clamping element between said first and second position by rotating said knob.

9. The support head according to claim 8, which has means of limiting the travel of said clamping element comprising a contact element capable of coming into contact with said clamping element, so as to define said first non-operating position.

10. The support head according to claim 9, wherein said contact element has a shape similar to a cup-shaped formation of the clamping element capable of coming into contact with said second joint element so that said cup formation, during its movement between said first and said second position, is accommodated and guided inside said contact element.

11. The support head according to claim 10, wherein said contact element has a hole passed through by a control pin of said clamping element, capable of moving said cup formation between said first and second position.

12. The support head according to claim 11, wherein said control pin is engaged by screwing in said hole and is engaged in said knob so that a rotation of said knob corresponds to a movement of said control pin in the direction defined by said first and second position.

13. The support head according to claim 9, wherein the position of said contact element in the direction defined by said first and second position is adjustable.

14. The support head according to claim 13, wherein said position of said contact element can be moved by means of a ring nut engaged by screwing onto said first joint element.

15. The support head according to claim 14, wherein said ring nut is restrained, with the possibility of relative free rotation, on said knob.

16. The support head according to claim 11, wherein said contact element is fixed in relation to said first joint element and said travel limiting means comprise a stop pin engaged on said knob and movable in relation thereto to come into contact with said control pin in a desired position between said first and second position.

17. The support head according to claim 16, wherein said stop pin is engaged by screwing onto said knob in the direction defined by said first and second position.

* * * * *